(12) United States Patent
Gajda et al.

(10) Patent No.: US 6,546,365 B1
(45) Date of Patent: Apr. 8, 2003

(54) SYSTEM FOR NATIONAL LANGUAGE SUPPORT AND AUTOMATED TRANSLATION TABLE

(75) Inventors: Kimberly Lynn Gajda, Raleigh, NC (US); Michael Joseph Johnson, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/497,915

(22) Filed: Feb. 4, 2000

(51) Int. Cl.[7] ............................................. G06F 17/20
(52) U.S. Cl. ............................................. 704/8; 717/8
(58) Field of Search .................. 704/8, 9–10; 707/536; 717/1, 4, 8

(56) References Cited

U.S. PATENT DOCUMENTS

| | | | |
|---|---|---|---|
| 5,224,039 A | 6/1993 | Cox et al. ............. | 364/419 |
| 5,309,358 A | 5/1994 | Andrews et al. ....... | 364/419.01 |
| 5,583,761 A | * 12/1996 | Chou ................... | 704/8 |
| 5,664,206 A | * 9/1997 | Murrow et al. ......... | 704/8 |
| 5,678,039 A | * 10/1997 | Hinks et al. .......... | 704/8 |
| 5,745,738 A | 4/1998 | Ricard ................. | 395/500 |
| 5,809,297 A | 9/1998 | Kroenke et al. ........ | 395/613 |
| 6,092,036 A | * 7/2000 | Hamann ................. | 704/8 |
| 6,092,037 A | * 7/2000 | Stone et al. .......... | 704/8 |

OTHER PUBLICATIONS

"National Language Support Enablement for Culture–Specific Operations" *IBM Technical Disclosure*, vol. 36, No. 11, Nov. 1993, pp. 629–637.

"Extracting the Translatable Text from an Office Systems/2 Program Integrated Information Source File" *IBM Technical Disclosure*, vol. 38, No. 10, Oct. 1995; pp. 319–321.

"Sizing of Textual Elements National Language Support" *IBM Technical Disclosure Bulletin*, vol. 37, No. 08, Aug. 1994, p. 169.

* cited by examiner

*Primary Examiner*—Patrick N. Edouard
(74) *Attorney, Agent, or Firm*—J. Bruce Schelkopf; Winstead, Sechrest & Minick

(57) ABSTRACT

An apparatus and method to construct programs for use in multiple-language environments. A subroutine is described to provide for reference to a translation table but maintain the self-documenting feature of direct coding. Also disclosed is an extractor program, which is capable of automatically creating a translation table based upon default values to be used for messages. Finally, the disclosed invention also provides a superior method of handling errors in translation table files by providing for a default message.

37 Claims, 6 Drawing Sheets

```
void main ()
    {
    char ltr;

printf("Input\n");
    printf("Please select a character.\n");
    scanf("%c",ltr);

printf("Output\n");
    printf("You entered: %c",ltr);
    }
```

| Message ID | English |
|---|---|
| 1 | Input |
| 2 | Please select a character |
| 3 | Output |
| 4 | You entered: |

| Message ID | Spanish |
|---|---|
| 1 | Entrada de informacion |
| 2 | Por favor, selecione cualquier tecla |
| 3 | Resultado |
| 4 | Ud. entrado: |

```
void tabprt(int msg)
    {
    switch(msg)
        {
        case 1: printf("Input\n");
        case 2: printf("Please select a character.\n");
        case 3: printf("Output\n");
        case 4: printf("You entered:  ");
        default: printf("Error\n");
        }
    }
void main()
    {
    char ltr;
    tabprt(1);
    tabprt(2);
    scanf("%c:,ltr);

tabprt(3);
    tabprt(4);
    printf("%c",ltr);
    }
```

FIG. 4

SYSTEM FOR NATIONAL LANGUAGE SUPPORT AND AUTOMATED TRANSLATION TABLE

TECHNICAL FIELD

The present invention relates in general to programming an application for use in multiple language environments. More particularly, the invention relates to a reliable method and system for accessing translation tables for efficient programming process and the automated creation of a translation table for output messages.

BACKGROUND INFORMATION

The ability of a software package to interact with users in multiple languages is a strong benefit. Such an ability not only allows a software package to be exported for use in other countries, but also permits a single piece of software to be used in a multi-national organization, where all users may operate in their native language keeping efficiency high.

Two programming technologies are popular to accomplish this result. Multiple versions of the source code may be maintained, each containing messages in the language for which the code is written. Alternately, message identification keys may be used in the code which relate to an external message table. In the latter case, a LANGUAGE setting in the application may select the translation table file to be used, or the translation table file may be switched out at any time to permit for a change of language.

The multiple-version method has the advantage of ease of development because of the self-documenting code created by the messages. However, this same method has the distinct disadvantage of multiple source code versions, each of which need to be maintained individually. The external message table method has the advantage of a single source code, but that source code is more difficult to read and can take longer to develop and document.

Accordingly, what is needed is a means to more simply and cost-efficiently write applications for multiple languages applications.

SUMMARY OF THE INVENTION

The invention is a system for multiple language support which features an automated translation table creation. The invention is well-suited for use in the creation of any application program for a multi-language environment.

The invention utilizes a subroutine to display messages to the user. The subroutine accesses the message translation table in order to determine what text to display to the user. In the event there is a failure or corruption of the message translation table, the instant invention provides a facility for a default message text to be displayed, so that the reliability of the system is enhanced.

The instant invention also provides for the automatic creation and maintenance of translation tables derived from source code developed using the instant invention. The invention features a message extractor utility program which extracts the message keys and associated default text into a translation table file for the language of the default text. A translator can then more easily translate this file to create other language files.

In addition to creating the first translation table file, the extractor utility can also compare the key/message pairs generated to prior versions of the translation table file and produce a list of those messages that must be re-translated in other message translation table files due to changed default text or new messages added.

The foregoing broadly outlines the features and technical advantages of the present invention in order that the detailed description of the invention that follows may be better understood. Additional features and advantages of the invention will be described hereafter, which form the basis of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 is an example of code written in the C programming language demonstrating user input and output, FIG. 3 is an example of two translation tables;

FIG. 4 is an example of C programming code which provides for input and output to a user in a single subroutine;

DETAILED DESCRIPTION OF THE INVENTION

In the following description, numerous specific details are set forth such as languages, computer programming languages, computer operating systems, microprocessors, bus systems, integrated circuits (I/S), display systems, input/output (I/O) systems, etc., to provide a thorough understanding of the invention. However, it will be obvious to those skilled in the art that the present invention may be practiced without such specific details. In other instances, well-known circuits, computer equipment, programming configurations, or file systems have been shown in block diagram form in order to not obscure the present invention in unnecessary detail. For the most part, details concerning timing considerations, specific equipment used, specific programming languages used, specific storage systems used, and the like have been omitted in as much as these details are not necessary to obtain a complete understanding of the present invention and are well within the skills of persons of ordinary skill in the art.

Figure 1:
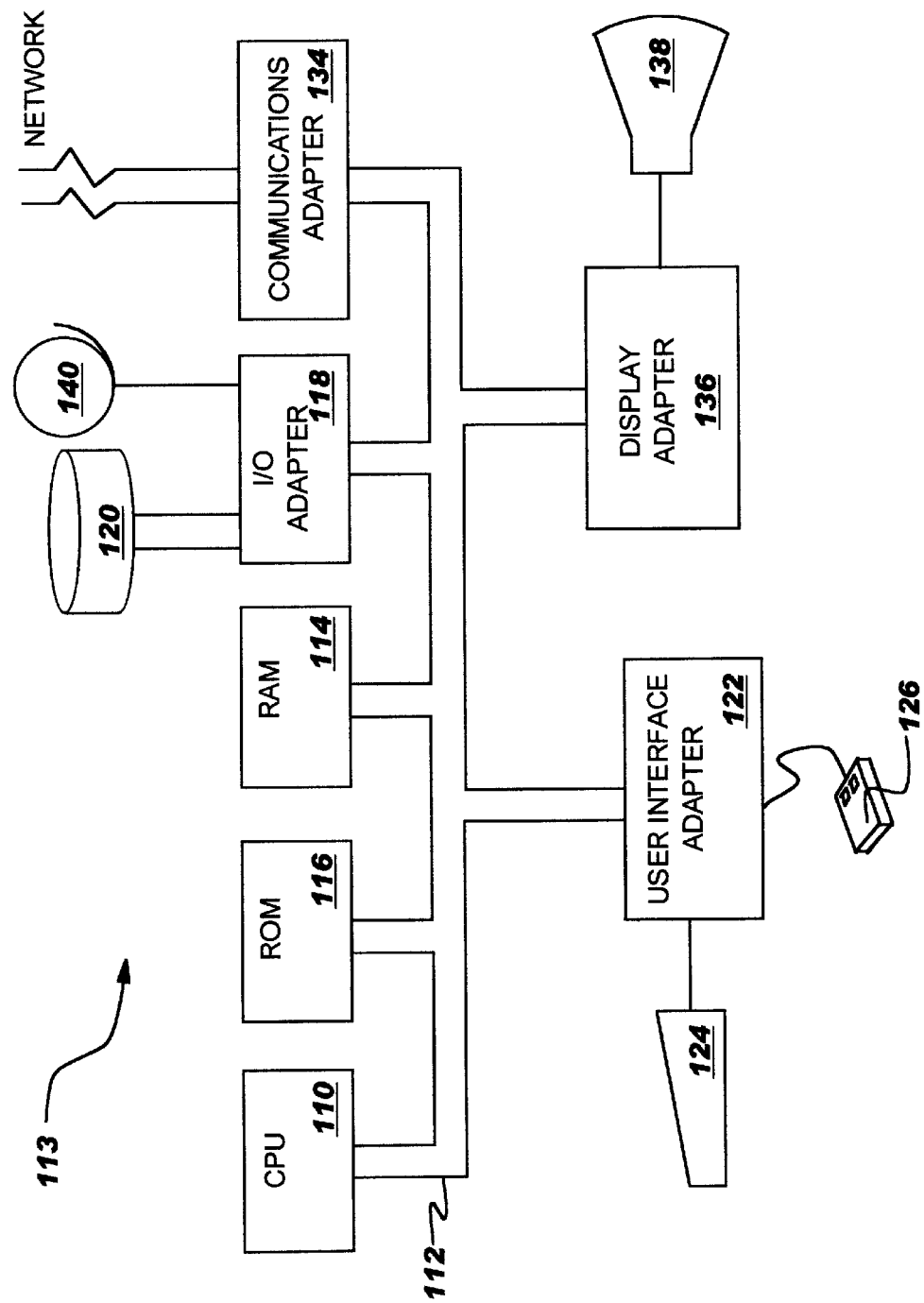
FIG. 1 is a system block diagram of a data processing system, including hardware and firmware, which may be used to implement the present invention.

A representative hardware environment for practicing the present invention is depicted with reference to FIG. 1, which illustrates the typical hardware configuration of a data processing system 113 in accordance with the subject invention. The data processing system 113 includes a central processing unit (CPU) 110, such as a conventional microprocessor, and a number of other units interconnected via system bus 112. The data processing system 113 includes a random access memory (RAM) 114, a read-only memory (ROM) 116, and an I/O adapter 118 for connecting peripheral devices, such as disk units 120 and tape drives 140 to the bus 112, a user interface adapter 122 for connecting a keyboard 124, a mouse 126 and/or other user interface devices such as a touch screen device (not shown) to the bus 112, a communication adapter 134 for connecting the data processing system 113 to a data processing network 142, and a display adapter 136 for connecting the bus 112 to a display device 138. The CPU 110 may include other circuitry not shown herein, which may include circuitry found within a microprocessor, e.g. execution unit, bus interface unit, arithmetic logic unit (ALU), etc. The CPU 110 may also reside on a single integrated circuit (IC).

The instant invention greatly simplifies the traditional method of programming applications for multiple-language environments. By using a special subroutine and an extractor program, the instant invention provides for self-documented programs which are easily translatable and which can be very easily modified and retranslated. As such, the instant invention represents a significant advance in the art.

The instant invention is best described with reference to traditional multi-language programming methods. Traditionally, user output may be accomplished directly within code, as demonstrated by FIG. 2, which depicts a typical C program that outputs messages directly to the user by means of the printf command. The output to be displayed to the user is passed to the printf command as a string parameter. Placing full messages within the code, as demonstrated by FIG. 2, eliminates the need for some documentation. For example, it is obvious that the scanf command will be reading a character which is representative of a character selected by the user because of the preceding two printf commands. Likewise, it would be obvious to one skilled in the art of the purpose of the last two printf commands, being to output the key previously pressed.

One method of adapting the programming shown in FIG. 2, to a multi-language environment is through the use of an external translation table. A representation of such a table is depicted in FIG. 3. Those skilled in the art will recognize that such a translation table may be stored in multiple files, one file for the English translation, a second file for the Spanish translation, and so on. The program shown in FIG. 2 may then be modified as demonstrated by FIG. 4, which demonstrates a main routine modified to use a translation table. Rather then directly outputting information to the screen and hard-coding messages within the main ( ) routine, the main ( ) routine of FIG. 4 makes subroutine calls which pass a variable associated with the message identification of the table, FIG. 3. FIG. 4 also demonstrates a subroutine called tabprt which operates to effect the table with a switch branch. However, those skilled in the art will readily recognize that the switch branch could be replaced by a routine that reads messages directly from an external file and writes that information directly to the screen, or any number of other duplications.

The main disadvantage of the printing method demonstrated by FIG. 4 is that extensive documentation is required. The purpose of the scanf or printf calls within the main ( ) routine is not evident without tracing to determine the various messages to be displayed from each message identification code used. However, unlike the program demonstrated with reference to FIG. 2, the FIG. 4 program is readily modified from one language to another because a translator may simply translate the message translation table rather than finding each message displayed within the entire program. While, such a task would not be difficult for the actual program demonstrated in FIG. 2, for a program having tens or hundreds of thousands of lines of code, the translation task becomes substantial, as will be appreciated by those skilled in the art.

Figure 5:
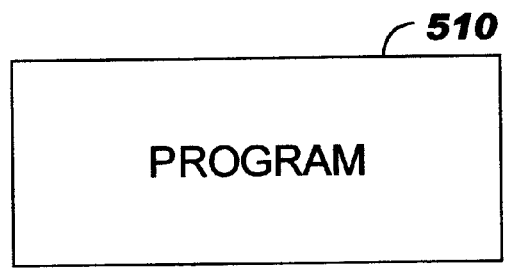
FIG. 5 is a system block diagram representing a program with messages imbedded in the code.
Figure 6:
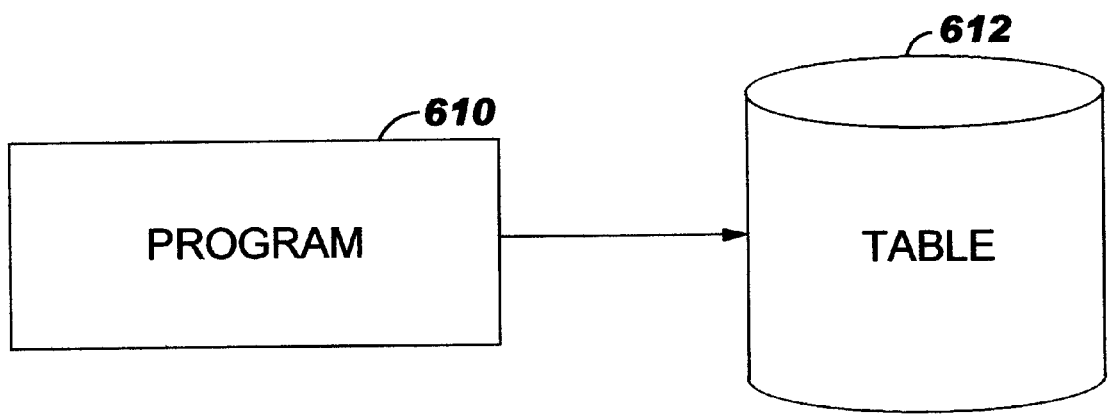
FIG. 6 is a system block diagram representing an external message table used by a program for output messages.

The program described with reference to FIG. 2 has the additional advantage of presenting a very simple system, as demonstrated with reference to FIG. 5. The program 510 may be packaged as a single unit, greatly reducing the need for additional files in order to track the program's operation for debugging and distribution. By contrast, the reference table method adds to the block diagram, as depicted with reference to FIG. 6. In such a case, the program 610 is accompanied by an external translation table 612. Often, the translation table 612 is embodied in a separate file and may be written in a different language, may contain only data, or otherwise inhibit a programmers ability to determine what is displayed on the screen in response to the calls from the program 610. Moreover, there may be multiple external translation tables, further adding to the complexity.

A disadvantage of either of the methods of programming is that modifications and additions to either program 510, 610 require retranslation and verification of the entire program or translation table. While retranslation and verification may be accomplished by attempting to identify the changes to the program and retranslate only those portions changed, this process is subject to a large degree of human error.

Figure 8:
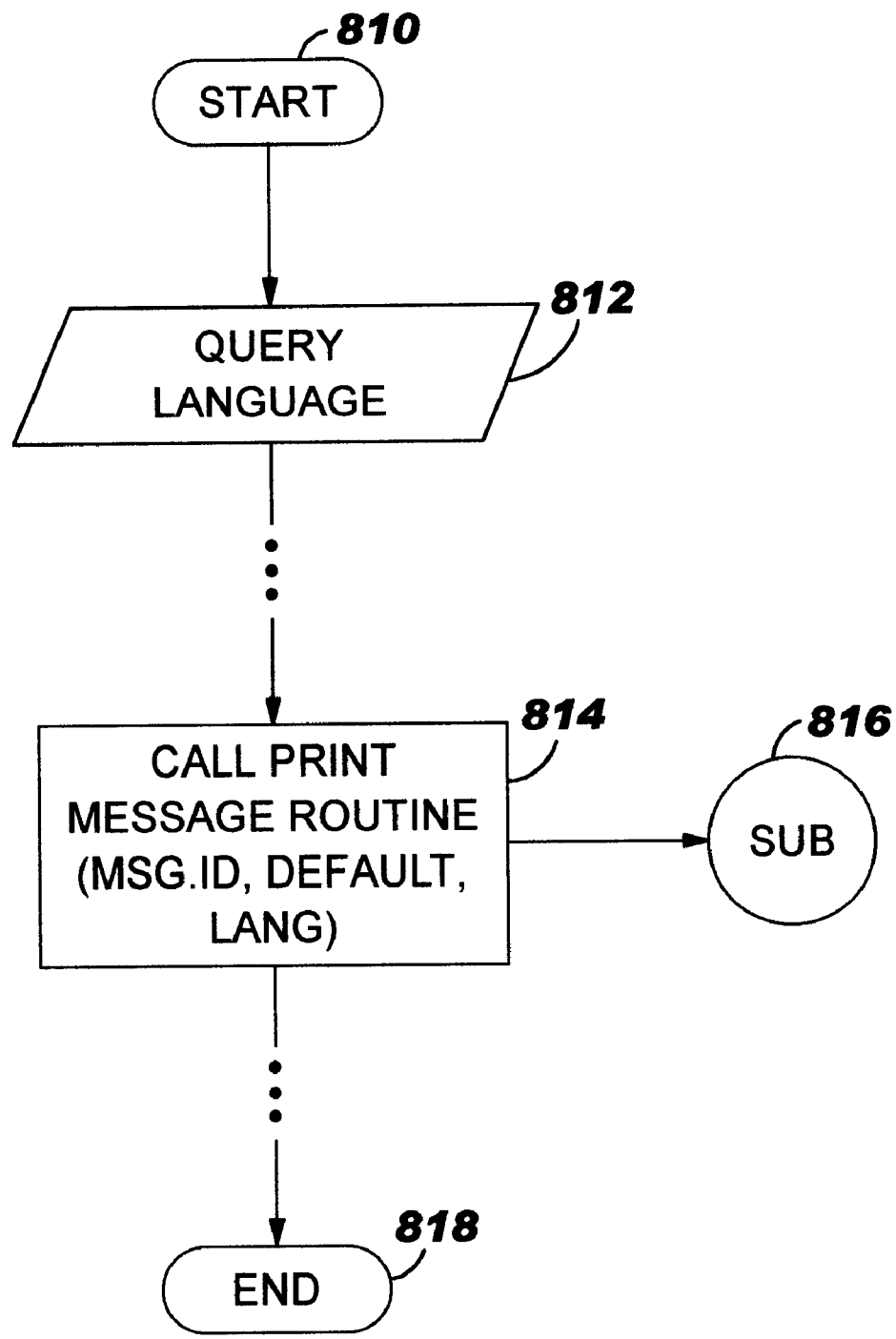
FIG. 8 is a flow chart according to ANSI/ISO standard 5807-1985 depicting the operation of a program using the instant invention.

A program utilizing the method and apparatus of the instant invention appears as described with reference to the flow chart in FIG. 8. The program starts 810 without particular precondition. However, one of the first steps that the program executes is to determine the language to be used in the remainder of the program 812. Those skilled in the art will recognize that the determination of language can be had from several sources, including direct user input, polling of information from a program configuration file, polling of the operating system or configuration files from the operating system, or the like.

When the programer wishes to display a message, a call to a print message routine is inserted in step 814. The print message routine calls a subroutine 816 and passes to it a message ID code, default text to be used for the message, and the language in which the message is to be displayed. Those skilled in the art will appreciate that the language need not be passed to the subroutine if the subroutine has the ability to poll the operating system or a configuration file directly for the language information. Similarly, if the determination of a language selection in step 812 then stores information regarding that selection as a global variable, then that information will be available to the subroutine 816 without need to pass the information.

Those skilled in the art will also appreciate that such a print message routine may be called at various points in time between the determination of the language 812 and the end of the program 818. By passing different message IDs and default messages to the subroutine 816, the program maintains the ability to communicate with the user.

Figure 9:
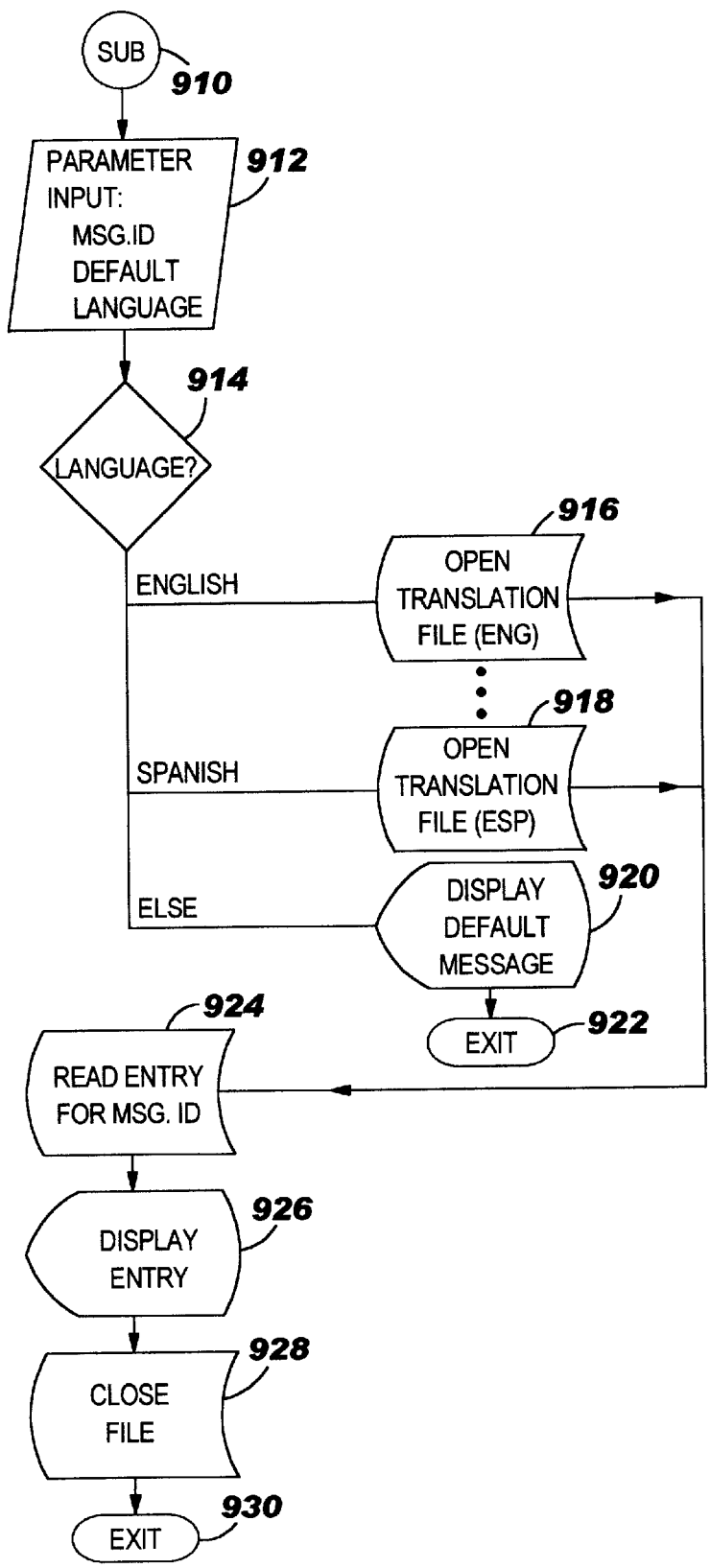
FIG. 9 is a flow chart according to ANSI/ISO Standard 5807-19 demonstrating the operation of the printing subroutine under the instant invention.

The subroutine 816 is shown with reference to FIG. 9. The execution begins 910 by receiving parameter input from the calling program of the message ID, the default string to be displayed, and the language in which to display the message 912. Those skilled in the art will appreciate that additional parameters may be passed to the subroutine to provide for additional information to be printed, such as the name of the calling routine, or other information in which the programmer does not wish translated.

The subroutine then branches according to the language selected 914. The subroutine opens a translation file 916, 918 depending upon the language selected. If the language selected does not exist, the selected message cannot be located in the file, or there is a corruption in the translation file, the subroutine displays the default message 920 and returns to the calling program 922.

Otherwise, the subroutine accesses the translation file for the entry corresponding to the message ID parameter 924. When the entry is retrieved, it is then output to the user 926. Those skilled in the art will recognize that output to the user may be accomplished by means of writing to a monitor display screen, writing to a media file, output to a printer, passing the text to an output formatting program or subroutine, or any of several other methods. Finally, the translation file is closed 928 and the subroutine execution returns to the calling program 930.

Figure 7:
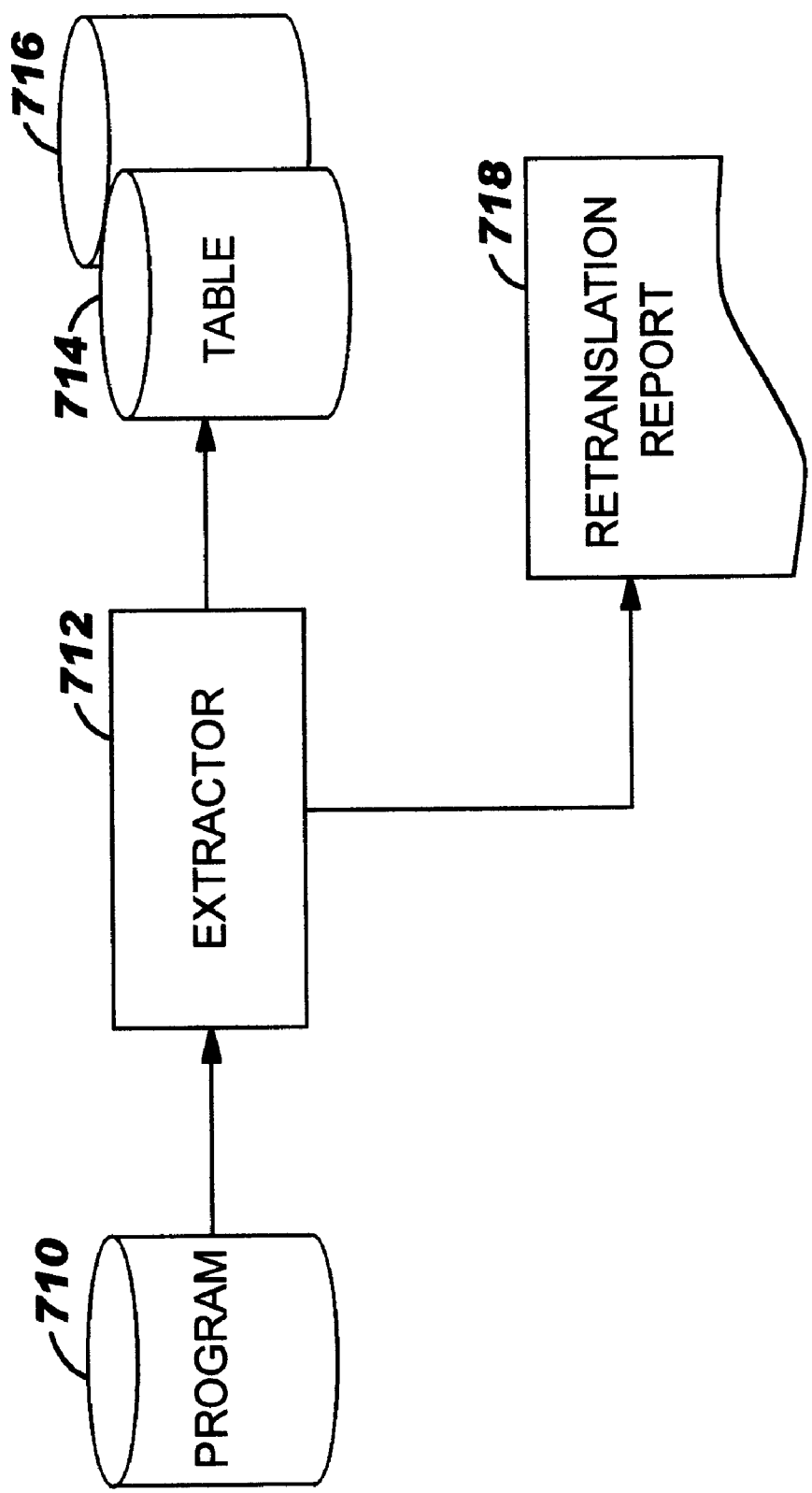
FIG. 7 is a system block diagram depicting the use of the extractor utility program of the instant invention.

A programmer need not create a translation table file using the instant invention. The instant invention provides for an extractor program as demonstrated with reference to FIG. 7. The extractor programer 712 reads from the programmed code 710 and searches for calls to the subroutine depicted in FIG. 8, 814. Upon locating such a call, the extractor enters the message ID and the default message text into a translation table 714. The message extractor utility then eliminates duplicate records and flags errors in the case that a message ID has two different default messages associated with it. The extractor program 712 also has the ability to compare the data in the translation table 714 with previous editions of the translation table 716. The extractor 712 can then generate a retranslation report 718 for each message within the translation table 714 which has changed relative to the previous version of the translation table 716. Accordingly, a translator need retranslate only the message IDs listed on the retranslation report 718 to other language translation tables (not shown). This feature reduces the work required of a human translator.

As to the manner of operation and use of the present invention, the same is made apparent from the foregoing discussion. With respect to the above description, it is to be realized that although embodiments of specific material, representations, compilers, languages, and file formats are disclosed, those enabling embodiments are illustrative and the optimum relationship for the parts of the invention is to include variations in composition, form, function, and manner of operation, which are deemed readily apparent to one skilled in the art in view of this disclosure. All relevant relationships to those illustrated in the drawings in this specification are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalants may be resorted to, falling within the scope of the invention.

What is claimed is:

1. In a multi-lingual computer environment, a method for outputting a message to a user comprising the steps of:
   calling a printing subroutine within a computer program to accomplish user output;
   passing the printing subroutine a message identification and a default message parameter;
   selecting a translation file according to a user's language;
   reading a message string from the translation file corresponding to the message identification; and
   if an error occurs while selecting the translation file or reading the message string, outputting the default message, otherwise outputting the message string.

2. The method of claim 1 wherein the user's language is determined by reading a configuration file.

3. The method of claim 1 wherein the user's language is determined by direct input from the user.

4. The method of claim 1 wherein the user's language is determined by polling an operating system.

5. The method of claim 1 wherein the outputting is accomplished by writing information to a display monitor.

6. The method of claim 1 wherein the outputting is accomplished by writing information to a printer.

7. The method of claim 1 wherein the outputting is accomplished by writing information to a file.

8. The method of claim 1 further comprising the steps of:
   automatically generating the translation file in a first language from the computer program; and
   translating the translation file into a second language within a second translation file.

9. The method of claim 8 wherein the translation file is generated by a method comprising the steps of:
   receiving input of a code of the computer program;
   scanning the input for calls to the printing subroutine;
   logging data comprising the message identification and the default message for each printing subroutine call;
   removing duplicate entries from the logged data;
   generating the translation file from the logged data; and
   generating an error report of the logged data which have identical message identifications and different default messages.

10. The method of claim 8 wherein the outputting is accomplished by writing information to a display monitor.

11. The method of claim 8 wherein the outputting is accomplished by writing information to a printer.

12. The method of claim 8 wherein the outputting is accomplished by writing information to a file.

13. The method of claim 9 wherein a subsequent translation file is generated by a method comprising the steps of:
   receiving input of a code of a subsequent version of the computer program;
   scanning the input for calls to the printing subroutine;
   logging data comprising the message identification and the default message for each printing subroutine call;
   removing duplicate entries from the logged data;
   generating a second translation file from the logged data;
   generating an error report of the logged data which have identical message identifications and different default messages;
   comparing the subsequent translation file to the translation file; and
   generating a modification report.

14. A method of creating a translation file for a multi-lingual computer program comprising the steps of:
   receiving input of a code of the computer program;
   scanning the input for calls to a multi-lingual printing subroutine;
   logging data comprising a message identification and a default message for each printing subroutine call;
   removing duplicate entries from the logged data;
   generating the translation file from the logged data; and
   generating an error report of the logged data which have identical message identifications and different default messages.

15. The method of claim 14 wherein a subsequent translation file is generated by a method comprising the steps of:
  receiving input of a code of a subsequent version of the computer program;
  scanning the input for calls to the printing subroutine;
  logging data comprising the message identification and the default message for each input call;
  removing duplicate entries from the logged data;
  generating a second translation file from the logged data;
  generating an error report of the logged data which have identical message identifications and different default messages;
  comparing the subsequent translation file to the translation file; and
  generating a modification report.

16. In a multi-lingual environment, an apparatus for outputting a message to a user comprising:
  a printing subroutine operable to accept parameters of a message identification and a default message; and
  a translation file selected according to the user's language,
  wherein a message string is read from the translation file corresponding to the message identification, and
  wherein if an error occurs while selecting the translation file or reading the string, the printing subroutine outputs the default message, otherwise the printing subroutine outputs the message string.

17. The apparatus of claim 16 wherein the printing subroutine selects the user's language by reading a configuration file.

18. The apparatus of claim 16 wherein the printing subroutine selects the user's language by direct input from the user.

19. The apparatus of claim 16 wherein the printing subroutine selects the user's language by polling an operating system.

20. The apparatus of claim 16 wherein the printing subroutine outputs to a display monitor.

21. The apparatus of claim 16 wherein the printing subroutine outputs to a printer.

22. The apparatus of claim 16 wherein the printing subroutine outputs to a file.

23. In a multi-lingual environment, a computer system comprising:
  a CPU;
  a storage system;
  a printing subroutine code executable by the CPU, wherein the printing routine code accepts a message identification and a default message parameter; and
  a translation file stored on the storage system and selected according to the user's language,
  wherein a message string is read from the translation file corresponding to the message identification, and
  wherein if an error occurs while selecting the translation file or reading the string, the printing subroutine outputs to the monitor the default message, otherwise the printing subroutine outputs to the monitor the message string.

24. The system of claim 23 further comprising a display system.

25. The system of claim 24 wherein the printing subroutine code selects the user's language by reading a configuration file.

26. The system of claim 24 wherein the printing subroutine code selects the user's language by direct input from the user.

27. The system of claim 24 wherein the printing subroutine code selects the user's language by polling an operating system.

28. The system of claim 24 wherein the display system comprises a monitor.

29. The system of claim 24 wherein the display system comprises a printer.

30. The system of claim 24 wherein the display system comprises a file.

31. A computer-readable medium having stored thereon computer-executable instructions for performing the steps of:
  calling a printing subroutine to accomplish user output;
  passing the printing subroutine a message identification and a default message parameter;
  selecting a translation file according to the user's language;
  reading a message string corresponding to the message identification parameter from the translation table; and
  if an error occurs while selecting the translation file or reading the string, outputting the default message, otherwise outputting the message string.

32. The medium of claim 31 wherein the printing subroutine contains steps to select the user's language by reading a configuration file.

33. The medium of claim 31 wherein the printing subroutine contains steps to select the user's language by direct input from the user.

34. The medium of claim 31 wherein the printing subroutine contains steps to select the user's language by polling an operating system.

35. The medium of claim 31 wherein the printing subroutine steps for outputting output to a display monitor.

36. The medium of claim 31 wherein the printing subroutine steps for outputting output to a printer.

37. The medium of claim 31 wherein the printing subroutine steps for outputting output to a file.

* * * * *